United States Patent [19]

Downing

[11] 3,754,528
[45] Aug. 28, 1973

[54] DEVICE FOR FEEDING ANIMALS
[75] Inventor: James H. Downing, Mineral, Va.
[73] Assignee: Harris Company, Inc., Mineral, Va.
[22] Filed: Jan. 28, 1971
[21] Appl. No.: 110,538

[52] U.S. Cl............. 119/52 AF, 119/56 R, 198/218
[51] Int. Cl............................................ A01k 05/02
[58] Field of Search...................... 119/51 R, 51 CF, 119/52 R, 52 AF, 56 R, 58, 61; 198/110, 111, 181, 189, 194, 218, 224

[56] References Cited
UNITED STATES PATENTS

| 3,333,574 | 8/1967 | Harris | 119/56 R X |
| 2,681,132 | 6/1954 | Knutson | 119/56 AF X |
| 3,077,995 | 2/1963 | Booth et al. | 119/56 R UX |
| 3,237,807 | 3/1966 | Garvey | 119/56 R X |
| 3,265,188 | 8/1966 | Redden | 119/56 R X |
| 3,306,261 | 2/1967 | Purdy | 119/52 B X |

OTHER PUBLICATIONS
Webster's Seventh New Collegiate Dictionary, G. & C. Merriam Co., 1965, p. 115, "1 cable."

*Primary Examiner*—Louis G. Mancene
*Assistant Examiner*—James H. Czerwonky
*Attorney*—Auzville Jackson, Jr.

[57] ABSTRACT

An apparatus for feeding animals including a positive simple chain drive unit, to move a belt or carpet to carry animal feed forward in a feed bunk, or backward to clean and reload, unlimited takeup means being provided to tighten or take up slack in the drive chain, eliminating all cables, winch drums, clutches, solenoids and some other parts formerly used. The takeup means includes a sprocket wheel secured to a shaft rotatably mounted on rigid means secured to one end of the moving belt. The sprocket wheel meshes with one end of the drive chain, whereby turning of the wheel adjusts the chain tension. A pin is provided for insertion through aligned apertures in the rigid means and through a link in the chain to hold the tightness thereof as desired.

2 Claims, 9 Drawing Figures

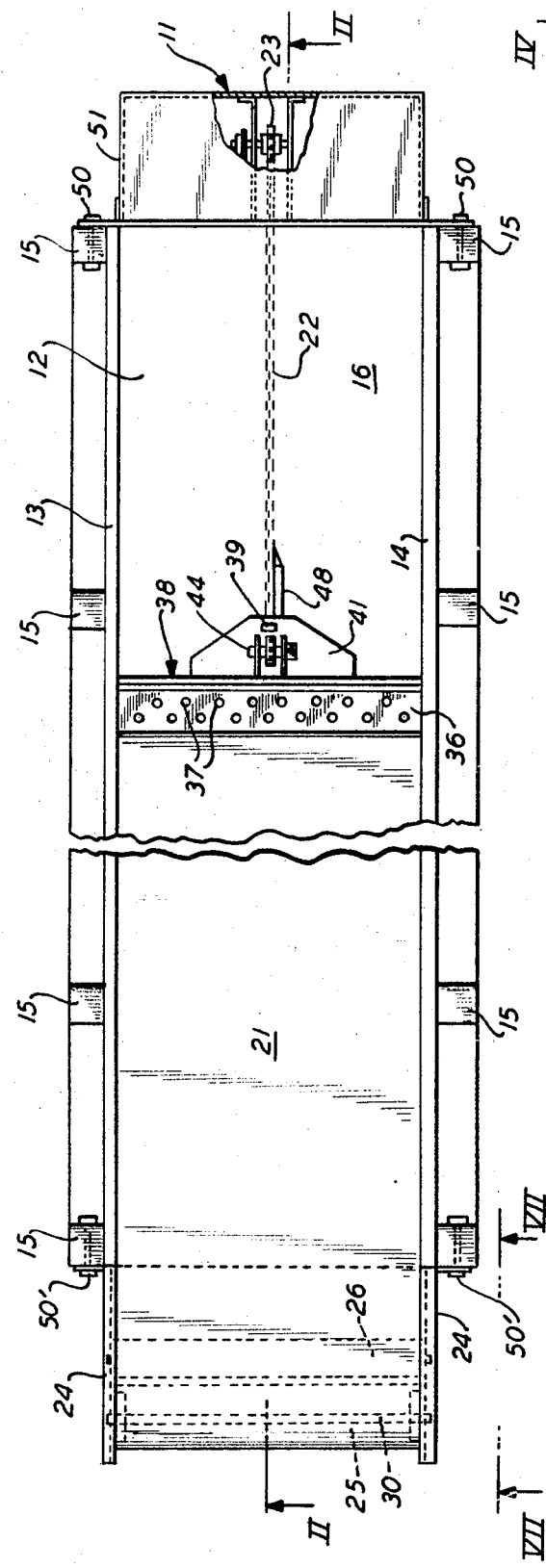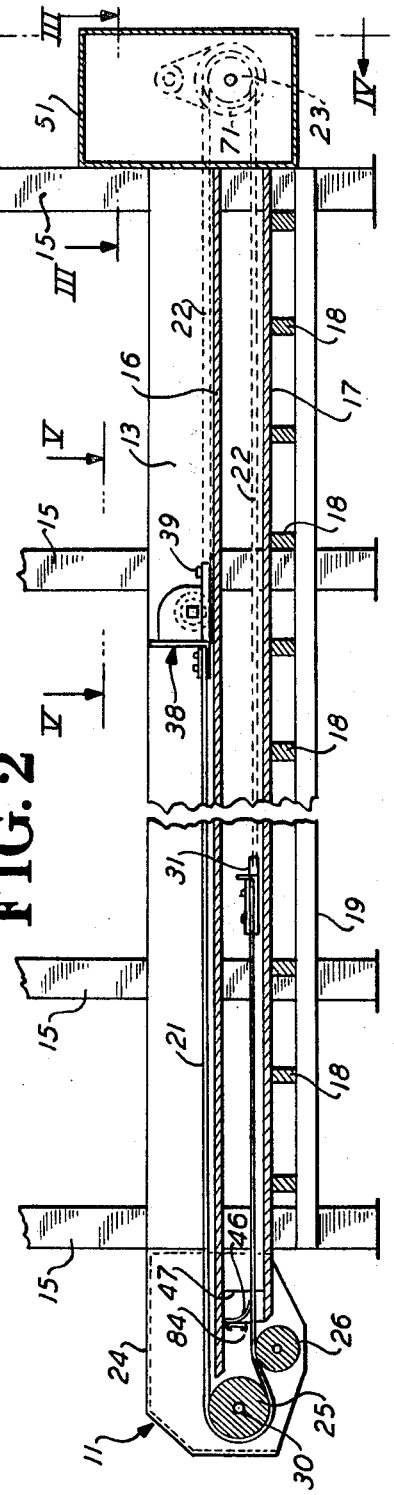

INVENTOR
JAMES H. DOWNING
BY Towson Price
ATTORNEY

INVENTOR
JAMES H. DOWNING
BY Towson Price
ATTORNEY

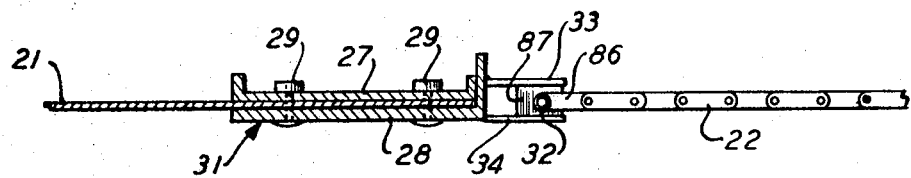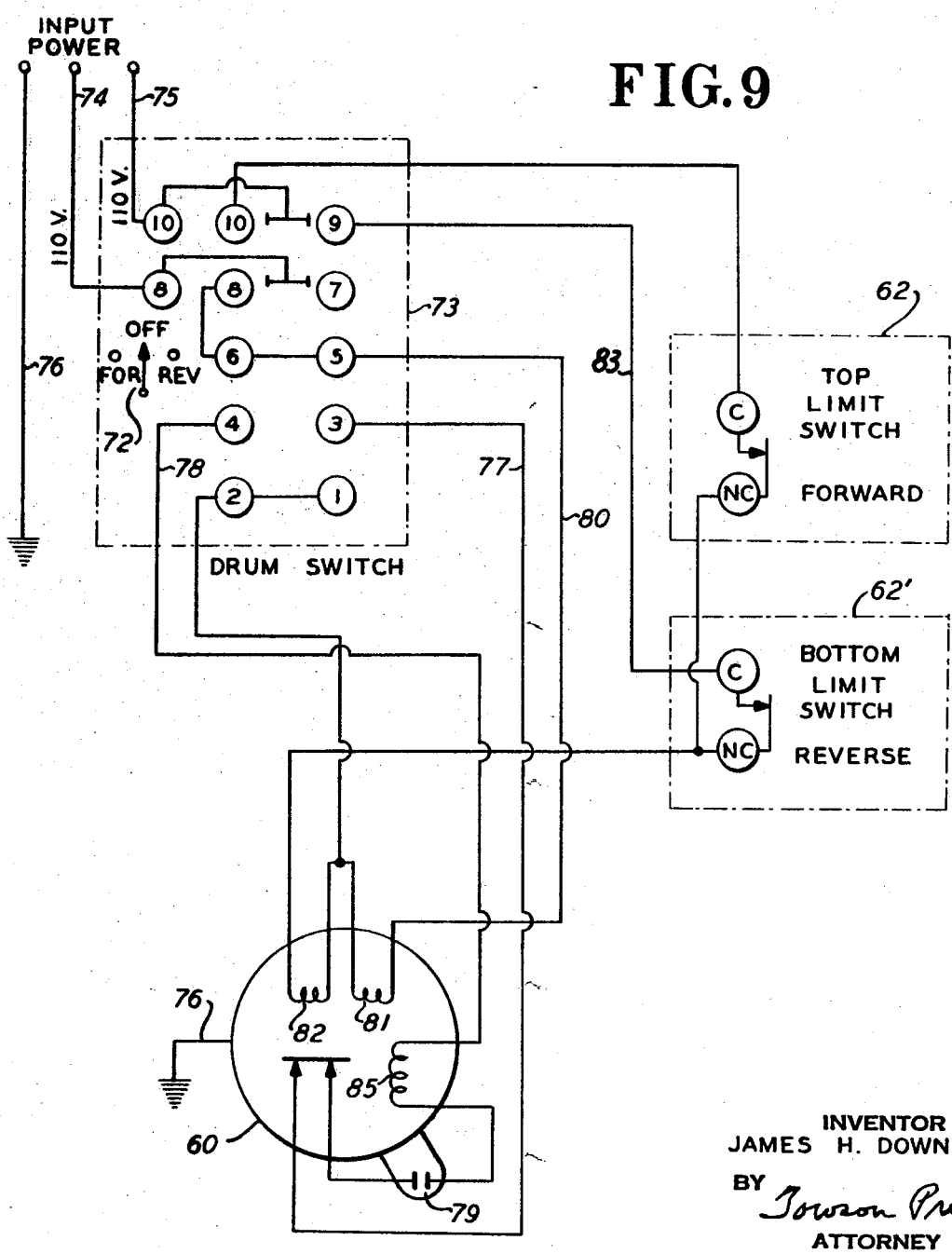

DEVICE FOR FEEDING ANIMALS

The invention, an improvement on the invention of U.S. Pat. No. 3,333,574, relates to the handling of particulate material, such as feed, for livestock such as cattle and other animals.

The device of the present invention relates to the handling of particulate material, such as cattle feed, which may be conveyed on a belt or carpet to an animal-feeding location where it stays while cattle or other animals eat it.

Endless feed-carrying means have previously been suggested for feeding livestock. Such means although labor-saving to a degree have not proved entirely satisfactory for various reasons, including expense.

In accordance with my invention, I use a belt, carpet or other flexible conveyor member which is longer than the total length of the feed trough to be used. This belt is entrained around a roller located at the loading end of the trough. This end of the trough is always located at or near the source of supply of the feed to be used. Clamps, which I call drawbars, are secured to each end of the belt. They are used to make the transition from the belt to a pulling chain which connects opposite ends of said belt.

The main object of the invention is to distribute livestock feed along the entire length of a feed trough on a flexible conveyor. The conveyor is slowly drawn toward the opposite end of the feed trough. When it approximately reaches the opposite end of the feed trough, it is stopped and remains stopped until the next time to feed, which may be a day later. The feed will be distributed from one end of the trough to the other on top of the flexible conveyor belt. The animals will eat until most or all of the feed is gone from the belt while in the trough.

When the next feeding time is due, the operator reverses a control switch, which causes the power unit to run in reverse direction and draw the flexible belt back and with most of it under the feed trough. This positions the belt for the next feeding. It automatically cleans the feed trough by removing the feed-holding belt and reversing it to allow the feed remains to drop off.

It is, therefore, a primary object of the present invention to provide a flexible conveyor arrangement for feed material or the like, driven first in one direction and then in the other, from one end of a feeding trough to the other, the sides of said trough being exposed so that animals may eat the material off the conveyor.

Another object of the present invention, in accordance with the foregoing, is to provide a chain-driving sprocket wheel assembly through which the feed-moving conveyor may be driven from a single reversible motor under control of an operator.

A still further object of the present invention is to provide, in association with a reversibly-driven feed-moving conveyor, limit control means for the reversible drive mechanism to automatically stop operation thereof as the conveyor approaches either of its limit positions.

An additional object of the invention is a labor-saving method of feeding livestock, wherein the animals are allowed to eat feed while it is on feed-transporting means, which is later removed and cleaned by reversing, preparatory to repetition of the operation.

These together with other objects and advantages which will become subsequently apparent, reside in the details of construction and operation as more fully hereinafter described.

In the drawings wherein like numerals refer to like parts throughout;

FIG. 1 is a fragmentary top plan view of the material-handling device of the present invention.

FIG. 2 is a fragmentary side elevational view, with parts in vertical section, on the line II—II of FIG. 1, in the direction of the arrows.

FIG. 8 is a fragmentary vertical substantially mid-sectional view of the parts connecting the lower ends of the belt and its chain, as shown in elevation in FIG. 2, but to a larger scale.

FIG. 9 is an electrical diagram showing the control circuit for starting, stopping and reversing the motor associated with the device of the present invention.

Figure 3:
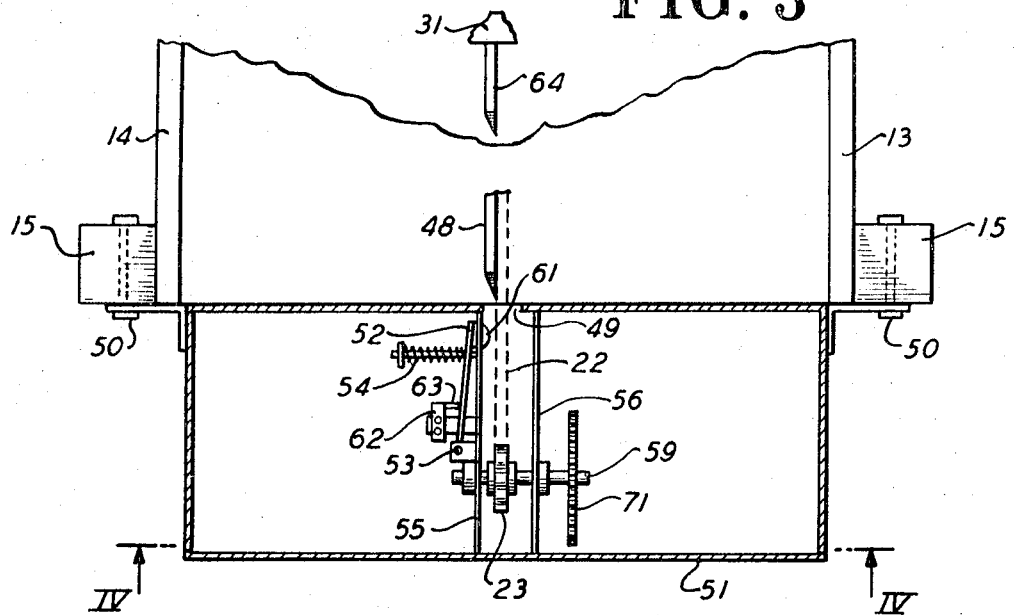
FIG. 3 is a fragmentary top plan view to a larger scale and with parts in horizontal section on the line III—III of FIG. 2 in the direction of the arrows, of the right hand portion of the device of FIGS. 1 and 2.
Figure 4:
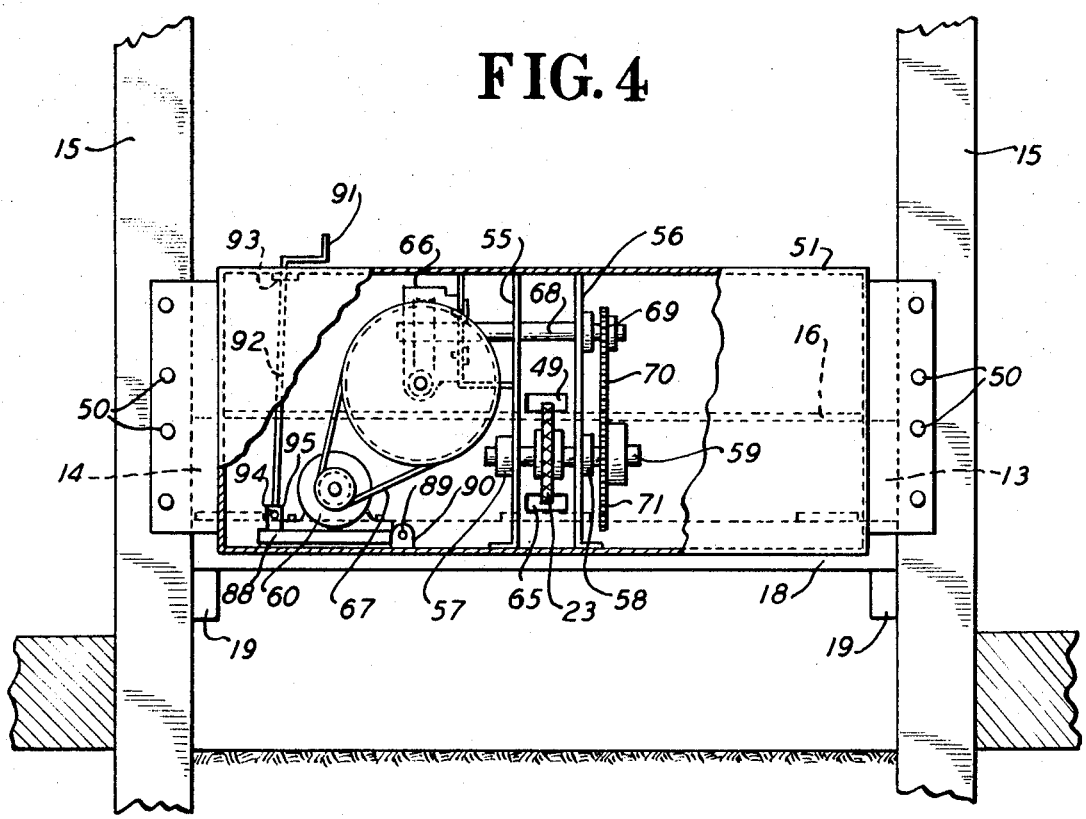
FIG. 4 is an end elevational view, to the scale of FIG. 3 and with parts in vertical section on the lines IV—IV of FIGS. 2 and 3, also showing parts of the motor drive for the device.

Referring now to the drawings in detail, it will be observed, from FIGS. 1 through 4, that the material-handling device or machine generally referred to by the reference numeral 11, is built around an elevated elongated horizontal trough or "bunk" 12 including a floor 16 and a pair of side wall members 13 and 14. The members 13 and 14 are secured to a plurality of vertical post members 15, so as to support them vertically spaced above the ground or other supporting surface. The trough may be of any desired length, usually between 80 and 120 feet long.

The trough or upper floor member 16 is secured to the side wall members 13 and 14 and supported between the vertical post members 15 by suitable means, such as the angle-iron members 20 of the patent referred to. Also supported between the post members 15, below the bottom member 16 of the trough 12 and in parallel spaced relation thereto, is an elevated elongated guide member forming a lower floor 17. The guide member may also be supported by similar angle iron members, or by transverse beams 18, in turn supported on longitudinal beams 19, secured to the posts 15.

Figure 5:
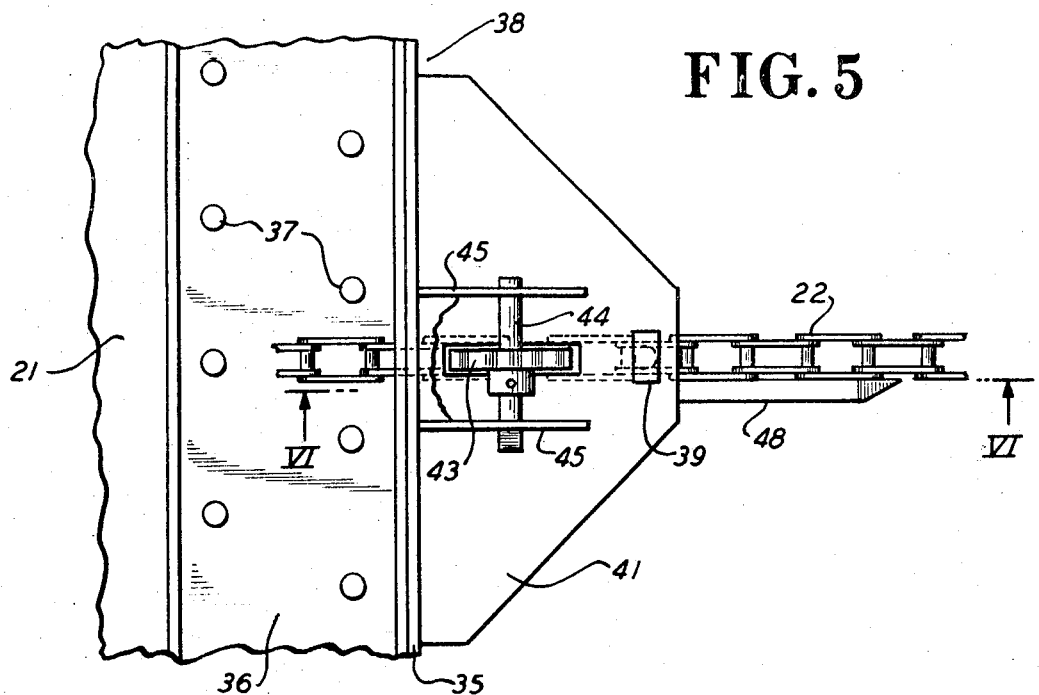
FIG. 5 is a fragmentary top plan view of the chain take-up mechanism and adjacent parts, as on the line V—V of FIG. 2, but to a larger scale.
Figure 6:
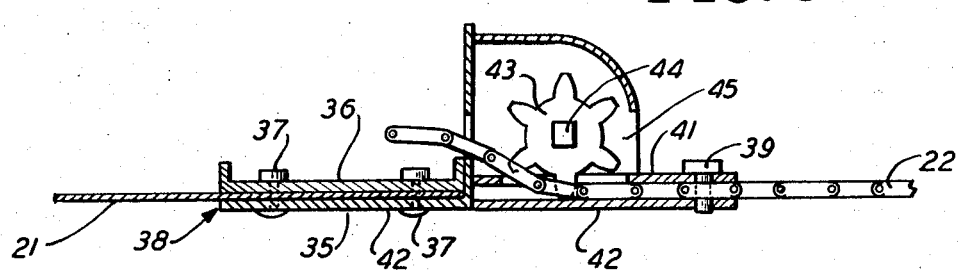
FIG. 6 is a fragmentary vertical sectional view on the line VI—VI of FIG. 5, in the direction of the arrows.

I here preferably use a feed-conveying belt 21 formed of flexible plastic material about ⅛ inch thick. I call this belt a "carpet." A chain 22, shown dashed in FIGS. 1 and 2 and in detail in FIGS. 5 and 6, is attached to each end of this belt. This chain 22 engages with the teeth of a drive sprocket 23 and makes a 180° turn around the sprocket as shown. This drive sprocket is located in the drive unit housing end portion 51 of the feed bunk, away from the feed supply. Its axis lies in a plane between the two floors 16 and 17 of the bunk as shown. The upper floor 16 supports the carpet 21 when it is pulled toward the sprocket 23. The lower floor 17 supports parts of the chain and carpet, the proportions depending on the position of the carpet.

Figure 7:
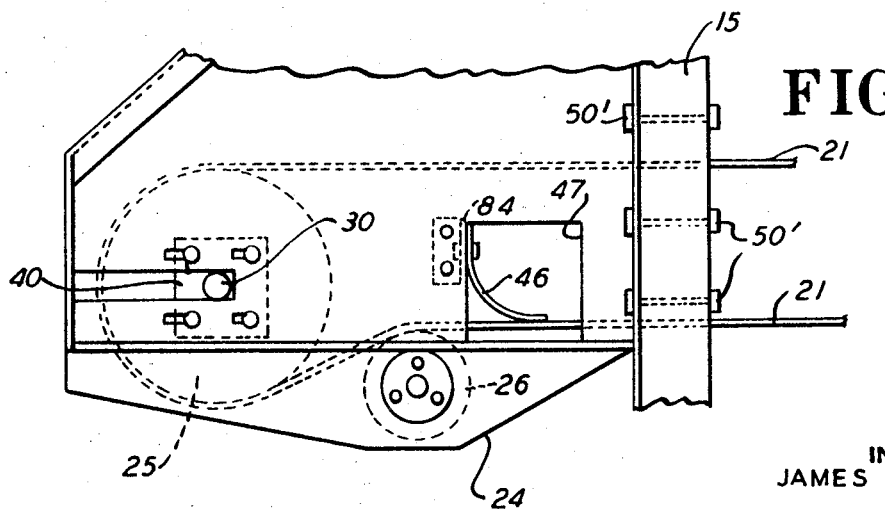
FIG. 7 is a fragmentary elevational view of the left hand portion of FIG. 1, as on the line VII—VII thereof, but to a larger scale.

One end of the trough 12 so formed constitutes a feed-receiving portion terminating in roller-supporting brackets 24, secured to posts 15 as by means of bolts 50'. As more clearly seen in FIG. 7, a relatively-large idler roller 25 is rotatably mounted between said brackets 24 about an axis disposed between the planes of the bottom of said trough and the top surface of the guide portion 17, as by means of roller-bearing assemblies 40. Said assemblies receiving the roller axle 30 are adjustably mounted in said brackets 24, as illustrated.

A smaller roller 26 contacts the feed engaged side of the carpet 21 and holds its lower part at the proper distance between the two floors 16 and 17, so that these floors may be closer together than the diameter of the big roller 25, about which the carpet is entrained.

The end portion of the carpet 21 that rides on the lower floor 17, is fastened between two metal members 27 and 28 by a series of bolts 29, as shown in FIG. 8, forming what I call a drawbar unit 31. The adjacent end of the chain 22 attaches to this drawbar unit by a horizontal pin 32 through the end holes in the plates 86 which make up the end male or inner link. These plates 86 are received between flanges 33 and 34 which may be welded to and outstand from the member 28. I provide a horizontally spaced pair of plates 87 which have registering holes receiving said pin 32. The pin may be held in place by suitable means, such as a head on one end a nut or cotter pin on the other.

The end portion of the carpet 21 that rides on the feeding floor 16, is fastened between two metal members 35 and 36, as by a series of bolts 37. I call this the top drawbar unit 38. The drawbar units 31 and 38 may carry guide shoes, like and for the purpose of the guide shoes 53 of the patent referred to, if so desired. The chain 22 attaches to this drawbar unit by a pin 39 that goes through a hole in the top plate or flange 41, welded to or integral with the member 35, a link in the chain 22 and a registering hole in the bottom plate or flange 42 of said unit 38, also welded to or integral with the member 35. A small slack-take-up sprocket wheel 43 is secured to shaft 44 pivoted between and in transversely-spaced vertical walls 45, rigid with and extending from the front of the drawbar 38. This shaft has a non-circular, preferably square, end portion or head. Thus a desirably long-handled wrench may be used to turn, by said head, the wheel 43 which engages links in the chain 22.

By turning the sprocket wheel 43, the chain 22 may be fed back through the drawbar 38 until the carpet and its chain 22 are tight, then the pin 39 may be dropped in place, to maintain the desired tightness. Finally the wrench may be relaxed and the top drawbar 38 pulled by the chain 22 through pin 39.

With use, the chain 22 will become slack, at which time the wrench may be put back on and turn the head of the shaft 44 enough so that the pin 39 can be removed. Sprocket wheel 43 may be given a partial turn until the chain 22 is tight again. Then the pin 39 is put down through another link in the chain 22. This can be repeated as many times as may be necessary to keep the system tight.

A cross bar 84 is mounted between the sides of the end portion brackets or frames 24 that support rollers 25 and 26. Bolted to this cross bar 84 is a flexible desirably plastic carpet scraper 46 which touches the carpet 21 and blocks any trash or foreign matter from going between said carpet and the roller 25 during the feeding cycle. The brackets 24 have apertures 47 to allow for pulling out matter scraped from the carpet.

Positive travel limit devices, formed as pointed plungers or spikes are provided on the front of each drawbar to cut off the electric power to a drive motor 60 when a drawbar approaches the drive end of its travel. This is done by having a spike 48 welded to the drawbar 38 so that it extends beside the chain 22 for several inches. Its end is tapered on three sides to a point to prevent hanging. As the sprocket 23 turns and draws chain 22 into the drive unit housing 51, disposed at the end opposite the brackets 24, and secured to posts 15 as by bolts 50 shown in FIGS. 3 and 4, it pulls the spike 48 into an opening 49 in said housing. It slides beside a cut-off pedal 52, forcing it sideways.

The pedal 52, with an end boss 61 is mounted on a pivot 53 and has a compression spring 54 to hold it against the housing partition wall 55, through which the boss 61 projects, which carries the pedal 52. Said wall 55, with the transversely-spaced wall 56, serve to hold the bearings 57 and 58 for the drive sprocket-supporting shaft 59. The tapered spike 48 then can engage the boss 61 and cause the pedal 52 to move sideways, operating a circuit-breaking device, such as a normally-closed micro switch 62, in the circuit to the motor 60 and stopping operation thereof.

The device 62, mounted near the pivot 53, is an electric switch with an operating prong or plunger 63 projecting therefrom which is contacted by the pedal 52 when it is moved sideways by spike 48. Compression spring 54 holds the pedal off the switch plunger, except when the tapered spike causes pedal 52 to depress said plunger and open the circuit to the motor, thus causing it to stop. Another similar device 62' (FIG. 9) is used for the bottom or return drawbar unit 31 and likewise actuated by a tapered spike 64 projecting from said drawbar. When the spike 64 protrudes through the opening 65, at the end of the chain travel in the other direction, it operates and opens said other switch 62'.

The electric motor 60 drives a worm gear unit 66 (FIG. 4) through a V-belt drive 67 and said gear unit turns sprocket 23 through a shaft 68 carrying a sprocket wheel 69. A roller chain 70 engages said sprocket wheel 69 and a larger one 71 fixed on shaft 59.

The drive motor 60 is desirably mounted on a base 88 pivoted to the bottom wall of the housing 51 by means of a pin 89 carried by a bracket 90, secured to said bottom wall. Adjustment of the tightness of the V-belt 67 is effected by turning the handle 91 of a crank on a shaft 92, threaded into a nut member 93, secured to the top wall of housing 51. The lower end of the shaft 92 is swiveled about the shaft axis, with respect to a pivot pin 94 turnable in a bracket 95, upstanding from the base 88.

A drum control switch 73 (FIG. 9) is used to select which direction the carpet is to be run by causing the motor 60 to turn in the corresponding direction. Once a drawbar plunger pushes a limit switch, the power circuit to the motor is opened and the machine 11 will no longer run in the then direction of motion. It can be run only in the opposite direction by a person manually moving the selection handle 72 on the drum switch 73, as shown in FIG. 9.

To operate, a person manually moves the handle 72 on the drum switch 73 and the machine runs to its limit in the selected direction and stops. Of course, the person can stop the machine at any point by putting the handle in the "off" position, even before a limit switch, such as 62, is contacted.

Referring now to FIG. 9, it will be observed that the reversible motor 60 may be connected to a source of electrical energy by the power lines 74 and 75 through a reversing drum switch 73 using a ground line 76. Accordingly, the direction of rotation of the motor 60 may be controlled by an operator through the reversing switch assembly for operation of the material-handling device 11, as aforementioned. When however the conveyor belt 21 approaches either of its limit positions, one of the switches 62 and 62' is opened in order to interrupt the motor circuit and thereby stop operation. Energization of the motor 60 may then be resumed only by moving the handle 72, changing the position of the reversing drum switch 73. As further explanation, note that to reverse the rotation of the motor, lines 77 and 78 are interchanged. Power flows from line 74 to the drum switch 73 and returns via line 75 for either operative position.

The motor 60, which I prefer to use in the disclosed embodiment of my invention, is a 1 H.P. single phase 115/230 volt, 60 cycle type, manufactured by Baldor Electric Co. of St. Louis, Mo. and other cities. It is a capacitor type, that is, with a condensor 79 to shift the phase for starting. It is identified in the Corporation's Data Section 503 of Mar. 31, 1969, for use with Catalog 500, as Nema 184T, Capacitor Start, No Thermal.

When the switch 72 is moved to the forward position, current flows through power line 74, the drum control switch 73, as illustrated or like the drum control switch 140 of the patent referred to, line 80, windings 81 and 82, top limit switch 62, switch 73, to power line 75. Current also flows from switch 73 through line 78, winding 85 and condenser 79, to complete the energization of the motor for moving the top section of the carpet 21 to the right, as viewed in FIG. 2.

Upon moving the handle 72 to the reverse position, current flows through power line 74, the drum control switch 73, line 80, windings 81 and 82, bottom limit switch 62', line 83 and drum control switch 73 to power line 75. Current also flows from switch 73 through line 77 to the condenser 79 and winding 85, in the reverse direction, to complete the energization of the motor for moving the top section of the carpet 21 to the left, as viewed in FIG. 2. This movement continues until the spike 64 (FIG. 3) opens the switch 62' and stops the motor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed. For background information which may be useful in considering the invention, U.S. Pat. No. 3,333,574 may be consulted.

I claim:

1. A livestock feeding device comprising an elongated trough, a belt guide portion disposed beneath said trough, a roller rotatably mounted at one end of said trough, a belt for holding feed for livestock on a portion thereof while in said trough, a sprocket wheel rotatably mounted adjacent the other end of said trough, a connecting chain passing around said sprocket wheel with one end connected to one end of said belt and the second end connected to the other end of said belt by an adjustably-connecting means, said adjustably-connecting means including a wheel with sprockets and secured to a shaft pivotally mounted on rigid means connecting with the upper end of the belt, so that said sprockets mesh with the adjacent end portion of the connecting chain, whereby turning said shaft may pull the end portion of said chain through an aperture in the rigid means until it is tight, and a pin for insertion through registering apertures in said rigid means and a link of said chain to hold the tightness desired.

2. A livestock feeding device comprising an elongated trough, a belt guide portion disposed beneath said trough, a roller rotatably mounted at one end of said trough, a belt for holding feed for livestock on a portion thereof while in said trough, a sprocket wheel rotatably mounted adjacent the other end of said trough, a chain passing around said sprocket wheel with its ends respectively connected to the ends of said belt, means for automatically stopping the travel of the belt when one end nears the end of the trough towards which it is traveling, other means for automatically stopping the travel of the belt when its other end nears the other end of the trough, said belt having one end connected to the chain through an upper drawbar above the bottom of said trough and its other end connected to the chain through a lower drawbar below the bottom of said trough, a slack-take-up wheel with sprockets secured to a shaft rotatably mounted on the top one of said drawbars at the junction between the end of the belt above the trough and the chain, said shaft having a non-circular portion to facilitate turning it and said wheel by a wrench, the sprockets of said wheel meshing with said chain to allow for tightness adjustment, and a pin for insertion through registering apertures in said drawbar and chain for holding the desired adjustment.

* * * * *